United States Patent
Gunsaulis (10) Patent No.: US 7,528,946 B2
(45) Date of Patent: May 5, 2009

(54) SYSTEM FOR DETECTING DEFLECTION OF A BORING TOOL

(75) Inventor: Floyd R. Gunsaulis, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 350 days.

(21) Appl. No.: 11/355,060

(22) Filed: Feb. 15, 2006

(65) Prior Publication Data

US 2007/0188742 A1 Aug. 16, 2007

Related U.S. Application Data

(63) Continuation-in-part of application No. 10/813,824, filed on Mar. 31, 2004, now Pat. No. 7,195,079.

(60) Provisional application No. 60/459,186, filed on Mar. 31, 2003.

(51) Int. Cl.
G01N 21/00 (2006.01)
E21B 25/16 (2006.01)

(52) U.S. Cl. .............. 356/241.3; 356/241.4; 356/241.5; 356/241.6; 175/45; 175/61; 175/62; 175/26; 33/304

(58) Field of Classification Search .............. 356/241.3, 356/241.4, 241.5, 241.6; 175/45, 61, 62, 175/26
See application file for complete search history.

(56) References Cited

U.S. PATENT DOCUMENTS

| | | | | |
|---|---|---|---|---|
| 3,529,682 A * | 9/1970 | Coyne et al. | .................... | 175/45 |
| 3,791,043 A * | 2/1974 | Russell | .......................... | 33/312 |
| 4,646,277 A * | 2/1987 | Bridges et al. | ............. | 340/853.5 |
| 4,673,312 A * | 6/1987 | Nussbaumer | ................ | 405/184 |
| 4,930,586 A * | 6/1990 | Turin et al. | .................... | 175/25 |
| 4,984,289 A * | 1/1991 | Arakawa et al. | ............. | 405/184 |
| 5,148,875 A | 9/1992 | Karlsson et al. | | |
| 5,314,030 A * | 5/1994 | Peterson et al. | ................ | 175/26 |
| 5,320,180 A * | 6/1994 | Ruley et al. | .................... | 175/26 |
| 5,449,046 A * | 9/1995 | Kinnan | ......................... | 175/24 |
| 5,513,713 A * | 5/1996 | Groves | ......................... | 175/73 |
| 5,850,624 A * | 12/1998 | Gard et al. | ..................... | 705/92 |
| RE37,450 E * | 11/2001 | Deken et al. | .................... | 175/62 |
| 6,315,062 B1 * | 11/2001 | Alft et al. | ...................... | 175/45 |
| 6,340,063 B1 * | 1/2002 | Comeau et al. | ................ | 175/61 |
| 6,415,878 B1 * | 7/2002 | Cargill et al. | .................. | 175/61 |
| 6,466,020 B2 * | 10/2002 | Kuckes et al. | ................ | 324/326 |
| 6,662,110 B1 * | 12/2003 | Bargach et al. | ................. | 702/6 |
| 6,668,946 B2 | 12/2003 | Rankin et al. | | |
| 7,084,782 B2 * | 8/2006 | Davies et al. | ............. | 340/854.4 |

(Continued)

FOREIGN PATENT DOCUMENTS

WO    WO 2004/090276 A1    10/2004

Primary Examiner—Roy M Punnoose
(74) Attorney, Agent, or Firm—Tomlinson & O'Connell, PC (57) ABSTRACT

A system for monitoring deflection of a downhole tool assembly. The system comprises a beam source directing a beam at a receptor positioned proximate the downhole tool assembly. The receptor detects the position of incidence of the beam at the receptor. A processor receives signals from the receptor and determines angular deflection of the downhole tool assembly based on incidence of the beam at the receptor. Information from other orientation sensors is also used to determine magnitude and direction of deflection. Deflection information is used by an operator or a control system to maintain or correct the course of the downhole tool assembly.

26 Claims, 6 Drawing Sheets

U.S. PATENT DOCUMENTS

| | | | |
|---|---|---|---|
| 7,287,337 B2 * | 10/2007 | Dimitroff | 33/308 |
| 7,306,058 B2 * | 12/2007 | Cargill et al. | 175/76 |
| 2004/0108139 A1 | 6/2004 | Davies | |
| 2004/0188142 A1 * | 9/2004 | Self et al. | 175/53 |
| 2006/0157278 A1 * | 7/2006 | Dolgin et al. | 175/45 |

* cited by examiner

SYSTEM FOR DETECTING DEFLECTION OF A BORING TOOL

FIELD OF THE INVENTION

The present invention relates generally to the field of drilling close tolerance on-grade boreholes, and more particularly to a system and method for determining the amount of deflection of a boring tool.

SUMMARY OF THE INVENTION

The present invention is directed to a downhole system for use in directional drilling. The system comprises a downhole tool, a receptor positioned proximate the downhole tool, a light source emitting a light beam and an electronics module. The light source is positioned such that the light beam illuminates at least a portion of the receptor. The electronics module is adapted to receive signals from the receptor and to determine an angular deflection of the downhole tool in response to the signals.

In another embodiment, the present invention is directed to a horizontal directional drilling system comprising a drive machine and a drill string having a first end and a second end, wherein the first end of the drill string is operatively connected to the drive machine. The system further comprises an alignment sensor assembly, a downhole tool, and a light source. The alignment sensor assembly comprises a housing, a receptor, and an electronics module. The housing defines a longitudinal cavity and has a first end and a second end, the first end connectable to the second end of the drill string. The receptor is positioned proximate the second end of the housing. The downhole tool is connectable to the second end of the housing of the alignment sensor assembly. The light source is adapted to emit a light beam and is positioned such that the light beam illuminates at least a portion of the receptor. The electronics module is operatively connected to the receptor and is adapted to receive signals from the receptor and to determine an angular deflection of the downhole tool in response to the signals.

In a further embodiment, the present invention is a method for detecting the angular deflection of a downhole tool. The method comprises directing a light beam from a known distance at a center point of a receptor positioned proximate the downhole tool, sensing a point on the receptor illuminated by the light beam, and determining an angle of deflection of the downhole tool from the illuminated point on the receptor and the known distance the light beam traveled.

In yet another embodiment, the present invention is directed to a method of directionally drilling a borehole along a pre-determined linear path. The method comprises rotating a string of drill pipe and advancing a boring head along the path, sensing the deflection of the boring head relative to a point anterior to the boring head as the bore progresses, transmitting the deflection information to an operator on the surface of the ground, and making corrections to restore the boring head onto the linear path based on the deflection information transmitted from the boring head.

DETAILED DESCRIPTION OF THE PREFERRED EMBODIMENTS

Horizontal directional drilling (HDD) permits installation of utility services or other products underground in an essentially "trenchless" manner, minimizing surface disruption along the length of the project and reducing the likelihood of damaging previously buried products. A typical HDD borepath begins from the ground surface as an inclined segment that is gradually leveled off as the desired product installation depth is neared. This depth is maintained—or a near horizontal path may be desirable instead—for the specified length of the product installation. Electrical lines, telephone lines, fiber optic data lines, and water and gas mains and services are commonly installed by HDD machines. However, HDD machines are used only infrequently to install on-grade gravity flow sewers because such sewers have very demanding grade control requirements. When boring a close tolerance, on-grade borehole the drainage grade may be very slight (<1%). There remains a need for systems to provide on-grade installation of utilities.

Figure 1:
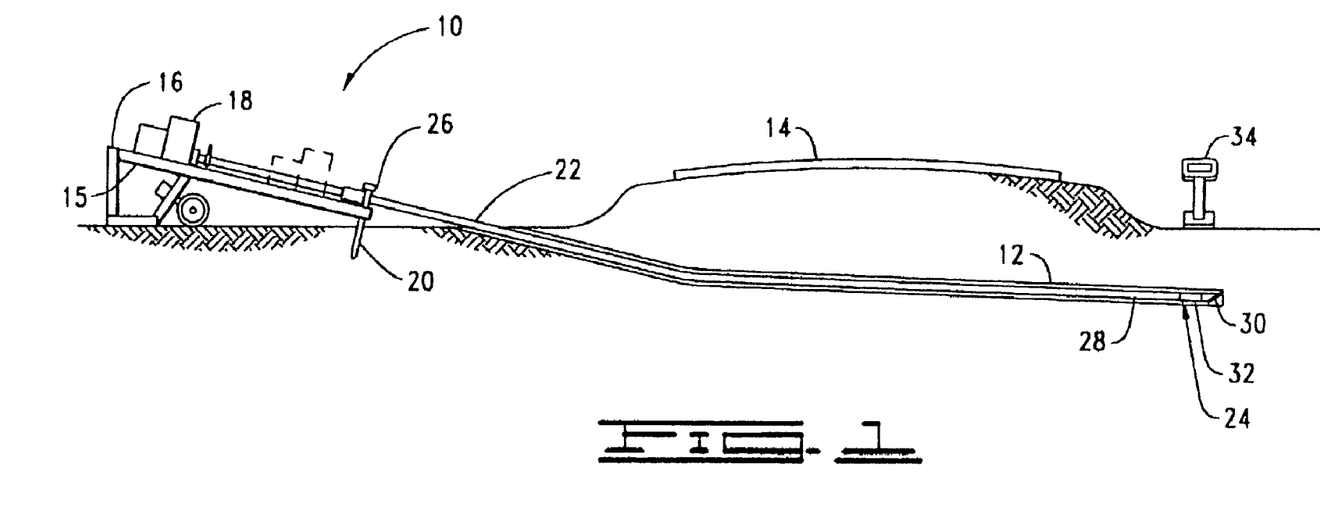
FIG. 1 illustrates a horizontal directional drilling machine and a laser-assisted downhole system built in accordance with the present invention.

With reference now to the drawings in general and FIG. 1 in particular, there is shown therein a horizontal directional drilling system 10 suitable for the subsurface placement of utility services on-grade. FIG. 1 illustrates the usefulness of horizontal directional drilling by demonstrating that a borehole 12 can be made without disturbing an above-ground structure, namely the roadway as denoted by reference numeral 14. The system 10 of FIG. 1 generally comprises a drilling machine 15 comprising a frame 16, a rotary drive system 18, and a plurality of anchors 20. The system 10 further comprises a drill string 22 and a downhole tool assembly 24. The drive system 18 is movably supported on the frame 16 of the machine 15 and connected to a first, uphole end 26 of the drill string 22. The drive system 18 provides rotational and axial forces to the drill string 22 to advance the downhole tool assembly 24 through the earth. As used herein, a drill string 22 may comprise a plurality of pipe sections connected in torque transmitting engagement, a coiled tubing system, a dual pipe system, or any other suitable drill string. The earth anchors 20 are driven into the earth to stabilize the frame 16 against the axial force exerted by movement of the rotary drive system 18 during axial advancement of the downhole tool assembly 24.

The downhole tool assembly 24 is operatively connected to a second, downhole end 28 of the drill string 22. The downhole tool assembly 24 preferably comprises a directional downhole tool 30 and a beacon assembly 32. As used herein, a directional downhole tool 30 is intended to refer to any downhole tool which may cause deviation of the tool from a straight path, such as a directional boring tool or a steerable backreamer. A directional boring tool may be any bit that causes deviation of the tool from the path when thrust forward without rotation, or when thrust forward with oscillatory rotation, or with other known steering methods and apparatuses.

Although the present invention will be disclosed and shown with a directional boring tool, the system is contemplated for use with any downhole tool or system adapted to direct the path of the borehole 12.

A receiver 34 disposed on the surface of the ground is adapted to receive signals transmitted from the beacon assembly 32 in a manner yet to be described. The receiver 34 may be any system on the surface compatible with a transmitter, yet to be described, disposed in the beacon assembly 32. In the embodiment shown in FIG. 1, the receiver 34 is a hand-held tracker carried by an operator (not shown). The receiver 34 receives data transmitted from the beacon assembly 32 and may provide instructions or information to the operator for restoring the boring tool 30 to a desired path.

Figure 2:
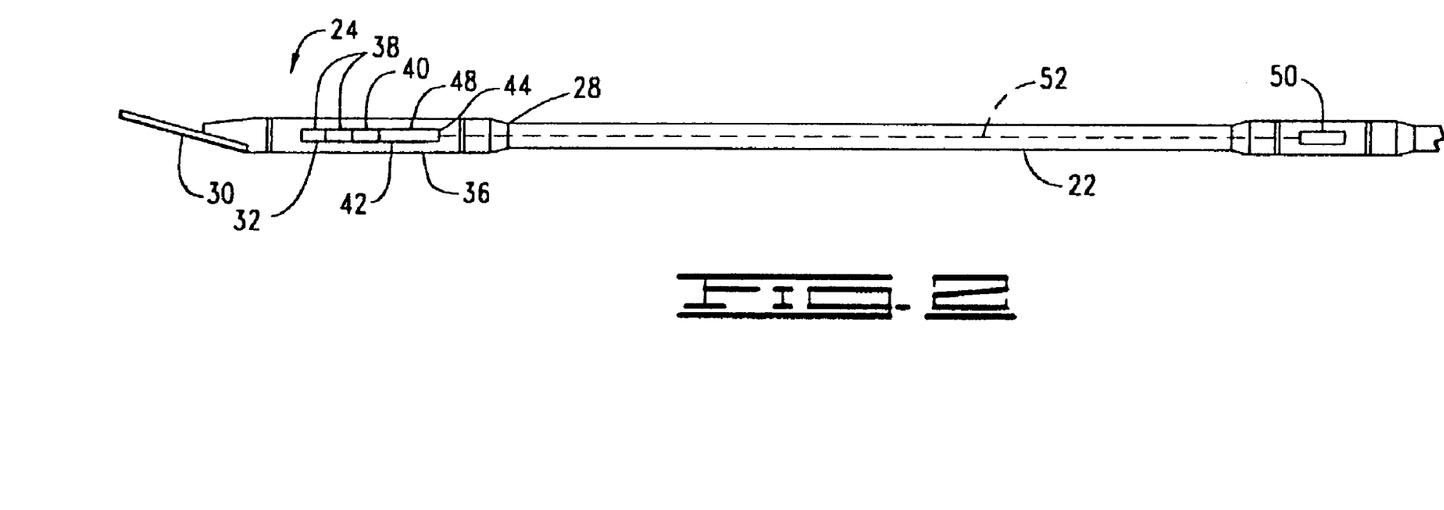
FIG. 2 shows a downhole end of a drill string having a laser-assisted downhole system built in accordance with the present invention.

Referring now to FIG. 2, the downhole tool assembly 24 of the present invention is shown in greater detail. The downhole tool assembly 24 preferably comprises a housing 36 for the beacon assembly 32. The housing 36 is connected at a first end to the downhole end 28 of the drill string 22. A second end of the housing 36 is connected to the boring tool 30. The beacon assembly 32 has a longitudinal axis and is disposed within the housing 36 such that the longitudinal axis is parallel to an axis of the drill string and a longitudinal axis of the housing.

The beacon assembly 32 preferably comprises a plurality of sensors 38, a processor 40, and at least one transmitter 42. The plurality of sensors 38 may be adapted to detect operational parameters of the boring tool 30 or the environment for the boring operation. The plurality of sensors 38 preferably comprises a pitch sensor, a roll sensor, a battery level sensor, and a temperature sensor, but additional sensors may be employed advantageously. The outputs of the sensors 38 are communicated to the processor 40.

The processor 40 is operatively coupled to the transmitter 42. Information received from the sensors 38 can be communicated from the downhole tool assembly 24 by the transmitter 42. Preferably, the transmitter 42 is a dipole antenna and information from the sensors 38 and processor 40 is communicated by a signal transmitted from the antenna. More preferably, the information from the sensors 38 is digitally encoded on a magnetic field transmitted by the antenna. However, other transmitter systems, such as a wireline system incorporated in the drill string 22 or a system for inducing a signal on the drill string, are contemplated for use with the present invention.

The downhole tool assembly 24 further comprises a photo receptor 44. The receptor 44 is adapted to discern the relative position of a remote beam source, yet to be described. The receptor 44 comprises a receiving surface 46 adapted to detect the incidence of or illumination by a beam from a remote beam source. Preferably, the receptor 44 comprises a light-sensitive receiving array. The receptor 44 may comprise a densely-packed array of individual sensors. More preferably, a two-dimensional monolithic large-area photodiode array may be used for the receptor 44, although the use of phototransistors or photocells, is also contemplated. One skilled in the art will appreciate a single planar receptor with a carefully controlled substrate resistivity distribution could also be used with the present invention.

Figure 3:
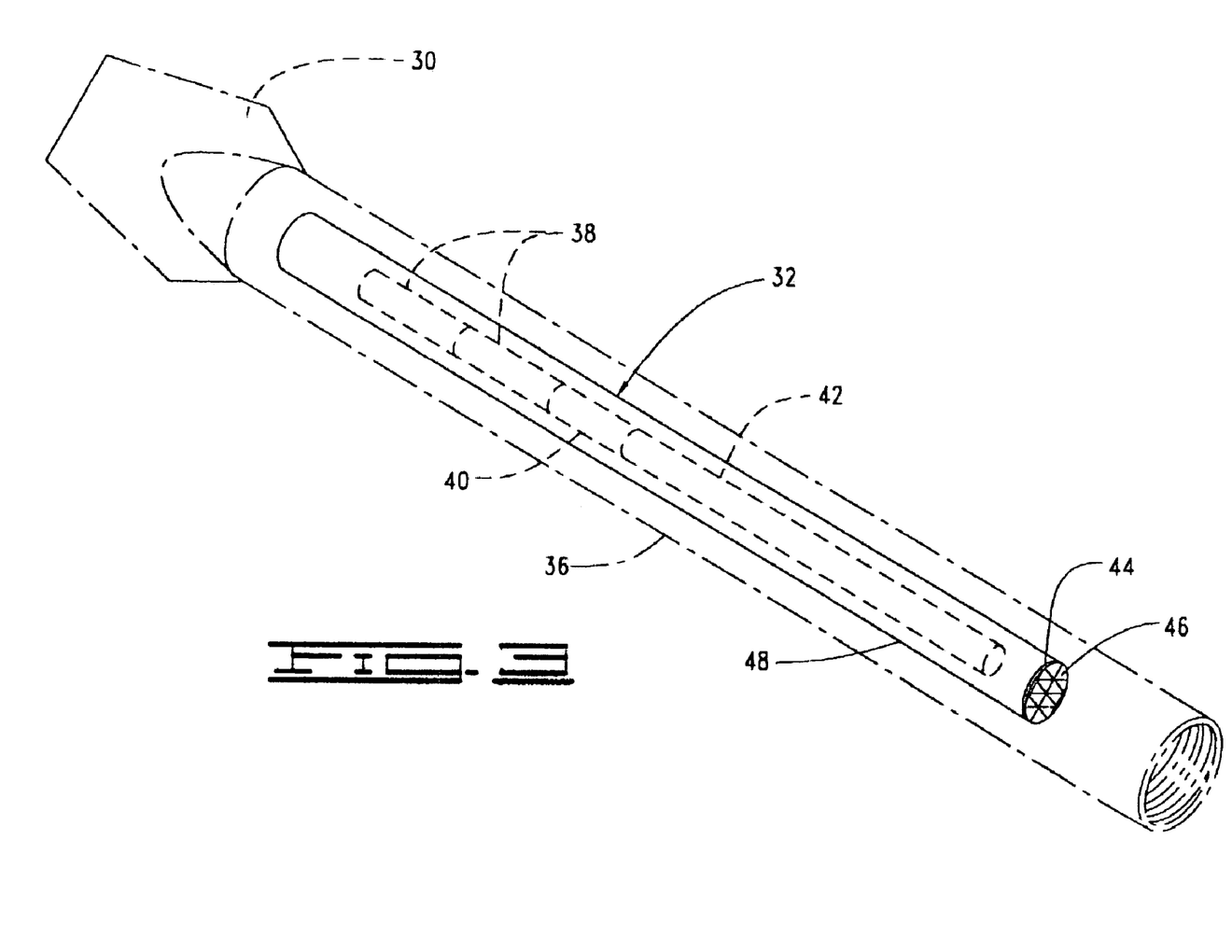
FIG. 3 is a partial cutaway of downhole tool assembly for use with the system of the present invention.

The receptor 44, shown in more detail in FIG. 3, comprises the planar receiving surface 46 in a grid format. The receptor 44 is secured proximate the beacon assembly 32 and in a known positional relationship. Preferably, the receptor 44 will be proximate a posterior end 48 of the beacon assembly 32 or the housing 36, remote from the boring tool 30. More preferably, the receptor 44 is positioned perpendicular to the axis of the beacon assembly 32 and the drill string 22. While described here as proximate the boring tool 30, the receptor 44 may be alternatively positioned and still provide information necessary to indicate angular deflection. For example, the receptor 44 could be located remote from the beacon assembly 32 with an associated processor and transmitter not shown). The beam source (yet to be described) would then be located proximate the boring tool 30.

The receptor 44 is operatively connected to the processor 40 in the beacon assembly 32. Alternatively, a separate independent processor may also be used for communicating with the receptor 44. The receptor 44 and processor 40 communicate to determine the relative position of the remote transmitter. In the preferred embodiment, the receptor 44 functions to receive and discern the area of illumination or incidence by a beam or other spot source from the yet to be described remote beam source. Signals from the receptor 44 communicate to the processor 40 the area of illumination or incidence. The processor 40 may then determine an angular deflection of the boring tool 30. The angular deflection information can then be provided to and communicated by the transmitter 42. Alternatively, the information related to the position of incidence of the beam on the receptor 44 can be communicated by the transmitter 42 for processing by the receiver 34 or another uphole device.

With reference again to FIG. 2, the present invention also comprises a remote beam source 50. Preferably, the remote beam source 50 comprises a laser emitter for transmitting a laser beam 52. Alternatively, the remote beam source 50 may comprise a high-intensity LED source or other suitable small-diameter spot source compatible with the receptor 44. One skilled in the art will appreciate that other elements and devices may be used with the beam source 50 to make the beam 52 effective. For example, the beam 52 may require focusing or collimating and additional devices may be provided for that purpose.

The beam source 50 is supported in the drill string 22 a known distance remote from the receptor 44. Preferably, the beam source 50 is placed within the same drill string 22 compartment, or drill pipe, as the receptor 44. The beam source 50 is arranged such that the laser beam 52 is directed coincident with the axis of the drill string 22 where the beam source is maintained. The beam source 50 may, alternatively, be positioned in a separate drill pipe provided a line of sight is available from the beam source to the receptor 44. Again, for alignment purposes, additional equipment may be used to target the beam source 50.

The beam source 50 is preferably also positioned such that the laser beam 52 illuminates a center point of the receptor 44 when the axis of the laser beam is coincident with the axis of the beacon assembly 32. In this way, any deflection in the section of the drill string 22 between the beam source 50 and the receptor 44 will cause the laser beam 52 to impinge outside of the center position of the receptor. The amount of deflection can be determined by the processor 40 using the point of incidence of the laser beam 52 at the receptor, the known distance between the beam source 50 and the receptor 44, and the data from the sensors 38 in the beacon assembly 32 as needed.

In the preferred embodiment of the present invention, the beam source 50 may be placed 100 inches from the receptor 44. With such a placement, a 0.1% variance of grade between the beam source 50 and the receptor 44 would result in a 0.1 inch movement of the position of incidence of the laser beam 52 on the receptor. The knowledge of the specific area illuminated on the receptor 44 along with knowledge of, for example, roll position from other sensors 38 could be processed to determine how much the boring tool 32 has deviated and in what direction from a desired path. The magnitude and direction of deviation information may be communicated by the transmitter to an operator or control system, where machine 15 operations could be initiated to bring the trajectory of the boring tool 32 back on the desired path or grade. Alternatively, the operator or control system might initiate machine 15 operations to keep a specific portion of the receptor 44 illuminated so as to maintain a particular curved path or change in grade. Other uses for the angular deflection information are anticipated, such as for use in mapping boreholes or tracking bend stresses of drill string 22 sections.

Figures 4, 5:
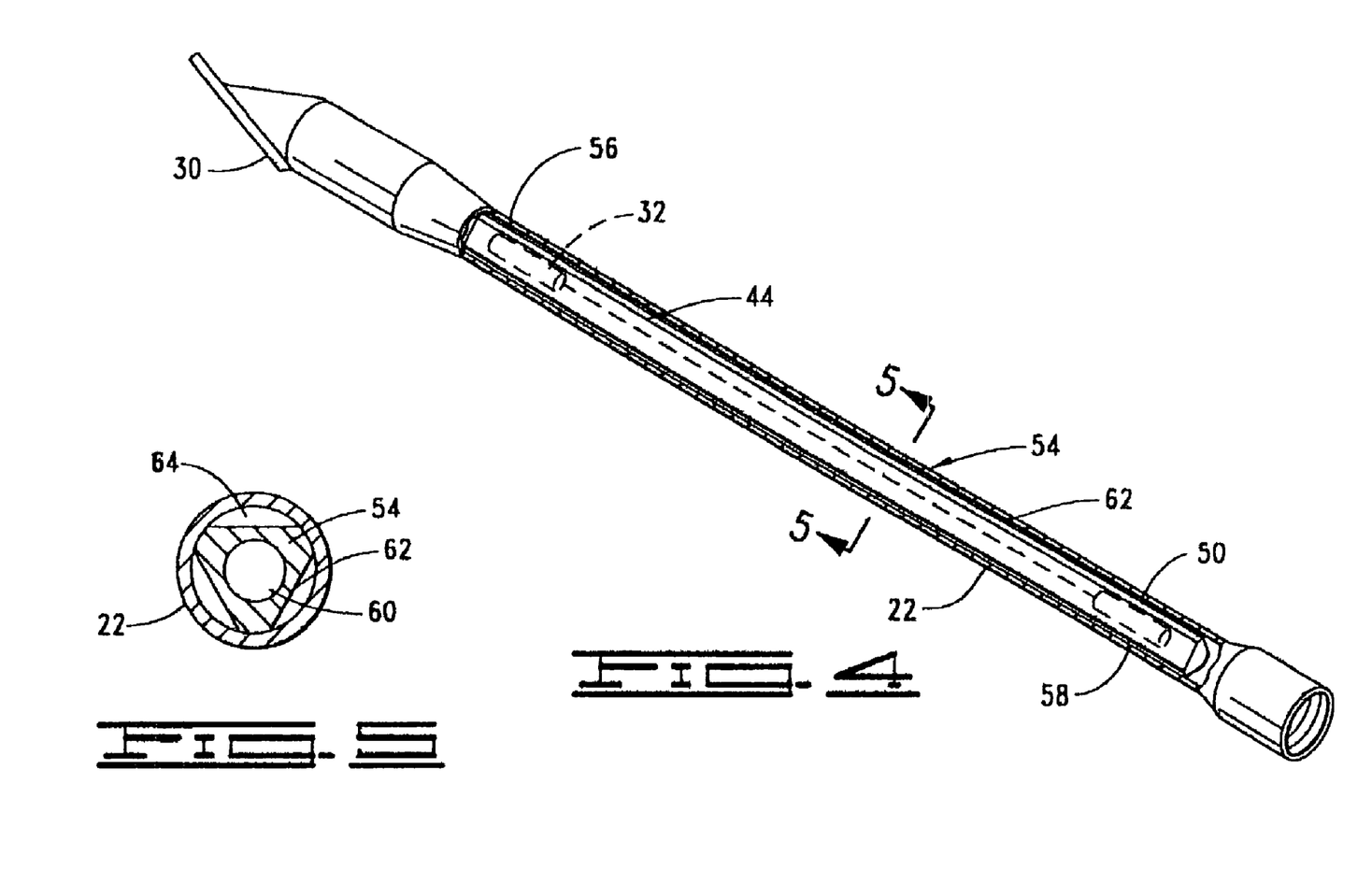
FIG. 4 shows a laser mount for use with a laser-assisted system of the present invention mounted in a drill pipe.
FIG. 5 is a cross section of the laser mount of FIG. 4.

The present invention is also contemplated for use in fluid assisted boring operations. When drilling fluid is used and transmitted through the drill string, the present invention would be disposed within a fluid-tight compartment to isolate the electronics from the drilling fluid. Referring now to FIGS. 4 and 5, there is shown therein a laser mount or housing 54 for use with the present invention. The laser mount 54 has a first end 56 and a second end 58 and is disposed in a section of the drill string 22 proximate the boring tool 30. Preferably, the first end 56 of the mount 54 is adjacent the boring tool 30 and the second end 58 is remote from the boring tool. The laser mount 54 is preferably composed of a durable plastic or other material which will not interfere with the magnetic field generated by the transmitter 42 in the beacon assembly 32.

The laser mount 54 defines an interior cavity 60 and has a longitudinal axis. The receptor 44 and the beam source 50 are contained in the interior cavity 60 of the laser mount 54. As shown in FIG. 4, the beacon assembly 32 is also positioned within the mount 54, proximate the receptor 44. Alternatively, the beacon assembly 32 may be maintained outside of the mount 54 and operatively connected to the receptor 44 inside the mount. Preferably, the beacon assembly 32 and the receptor 44 are positioned proximate the first end 56 of the laser mount 54, so that the longitudinal axis of the beacon assembly is parallel to, and the center point of the receptor is coincident with, the longitudinal axis of the laser mount. The beam source 50 is preferably positioned proximate the second end 58 of the mount 54 such that the laser beam 52 is coincident with the longitudinal axis of the laser mount and impinges the center of the receptor 44. The first end 56 and the second end 58 of the laser mount 54 are sealed with plugs (not shown) to prevent the intrusion of fluid into the interior cavity 60.

The laser mount 54 further has an exterior surface 62 that creates at least one fluid passage 64 between the mount and the drill string 22. The passage 64 permits flow of drilling fluid past the laser mount 54 and through the section of the drill string 22 containing the laser mount. In the preferred embodiment shown in FIG. 4, the laser mount 54 has a quasi-triangular shape. Alternatively, other shapes, splined surfaces, or mounts with fluid passages passing through the mount are contemplated. The laser mount 54 of FIG. 4 is shown in cross section as installed in the drill string 22 in FIG. 5.

One skilled in the art will appreciate the use of the present invention to assist in boring operations where close tolerance, on-grade boreholes are desired. To determine if a boring tool 30 and a boring operation is being maintained within tolerance, the beam source 50 may be position in a section or portion of the drill string 22. The beam from the beam source 50 is directed at the receptor 44 positioned in the drill string 22 a known distance from the beam source. The receptor 44 will sense an area on the receptor illuminated by the beam. In a static position or when the boring tool is boring in a straight line and not deflected, the beam is directed at and illuminates a center point of the receptor 44. Where the center point of the receptor 44 is not illuminated by the beam, the processor 40 may determine an angle of deflection of the drill string 22 from the illuminated area on the receptor and the known distance the light beam traveled. Where an orientation sensor is used to sense the orientation of the boring tool 30, and consequently the receptor 44, a heading change may be determined from the angle of deflection and the orientation of the boring tool.

Figure 6:
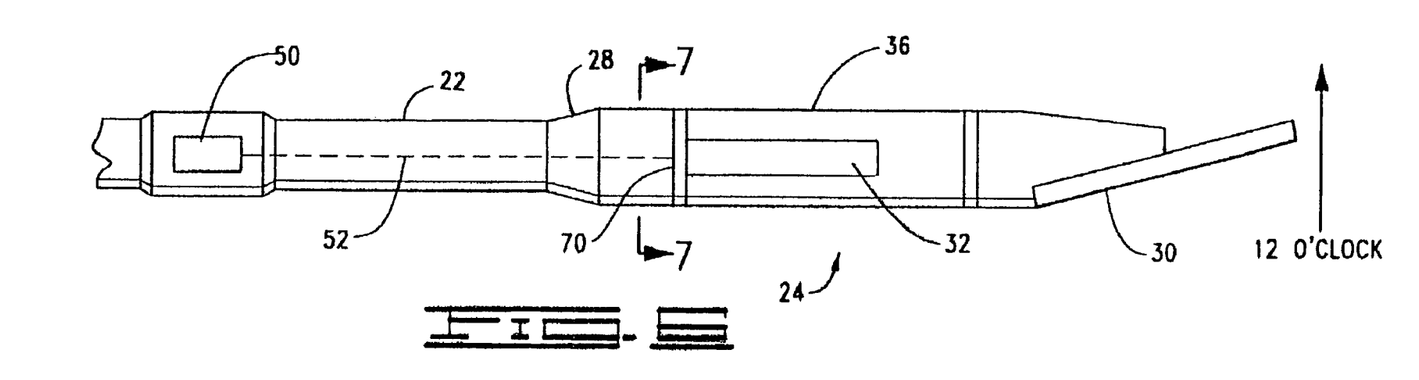
FIG. 6 is an alternative embodiment of a receptor for use with the present invention.

With reference now to FIG. 6, there is shown therein an alternative embodiment of a photo receptor for use with the present invention. In the embodiment of FIG. 6, the downhole tool assembly 24 again comprises the housing 36 for the beacon assembly 32. The first uphole end of the housing 36 is connected to the downhole end 28 of the drill string 22. The second end of the housing 36 is connected to the boring tool 30. As shown in FIG. 6, the boring tool 30 comprises a drill bit oriented to a roll position of 12 o'clock.

Figure 7:
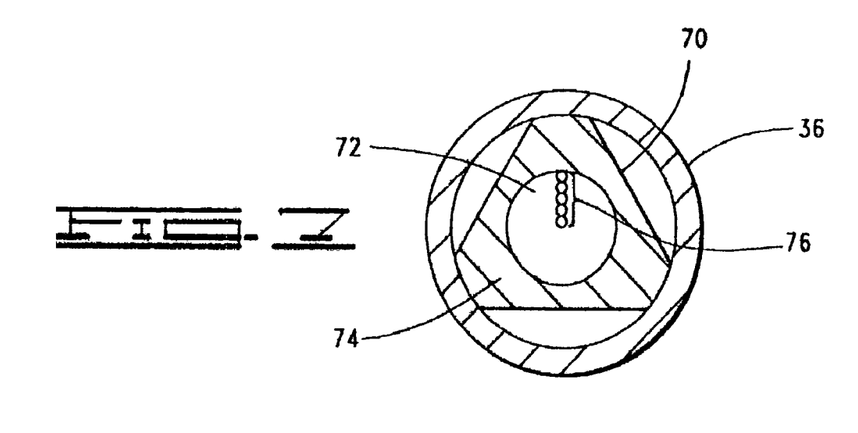
FIG. 7 is a cross section of the receptor shown in FIG. 6.

Referring now also to FIG. 7, the downhole tool assembly 24 further comprises a photo receptor 70 positioned proximate the beacon assembly 32. The receptor 70 comprises a receiving surface 72 secured perpendicular to the axis of the drill string 22. The receptor 70 is positioned proximate the beacon assembly 32 and adapted to detect the beam 52 from the beam source 50. The receptor 70 is electronically connected to the beacon assembly 32 to communicate the detection of the beam 52 from the beam source 50.

A receptor mount 74 may be used to secure and position the receptor 70 within the housing 36. As shown, the mount 74 comprises a quasi-triangular shape and may be secured to the housing 36 at the corners of the triangle. Other means of securing the receptor 70 and mount 74 are also contemplated; for example, the receptor and mount could be secured to the beacon assembly 32 as in previous embodiments. The present embodiment of the receptor 70 may also be used with the laser mount 54 of FIG. 4 to house the beam source 50, the receptor 70, and the beacon assembly 32.

In the embodiment shown in FIG. 6, the receiving surface 72 comprises a single linear array of photodiodes 76. The array of photodiodes 76 preferably begins in the center of the receiving surface 72 and extends radially to an outside edge of the surface. More preferably, the array of photodiodes 76 is aligned with the 12 o'clock roll position of the boring tool 30. With the linear array of photodiodes 76 disposed in this way, the beam source 50 will illuminate at least one of the photodiodes during each revolution as drilling occurs. The incidence of the beam 52 on the array 76 will give the operator of the drilling system 10 (FIG. 1) an indication of an amount of relative deflection as the bore is progressing.

To determine the direction of the deflection, the operator would be required to stop rotation and forward advancement of the drill string 22, and then slowly roll the drill string and the downhole tool assembly 24 until one of the photodiodes 76 is constantly illuminated. The direction of deflection would then be 180° opposite the direction indicated by the roll sensor. Thus, if an outermost photodiode 78 is constantly illuminated when the drill bit and roll sensor indicate a roll position of 3 o'clock, the direction of deflection of the receptor 70, and consequently the downhole tool assembly 24, would be to the 9 o'clock direction. To remove the deflection, the downhole tool assembly 24 could then be advanced without rotation causing the downhole tool assembly to deviate its current path in a direction opposite the current deflection until a center photodiode 80 was again illuminated.

Figure 8:
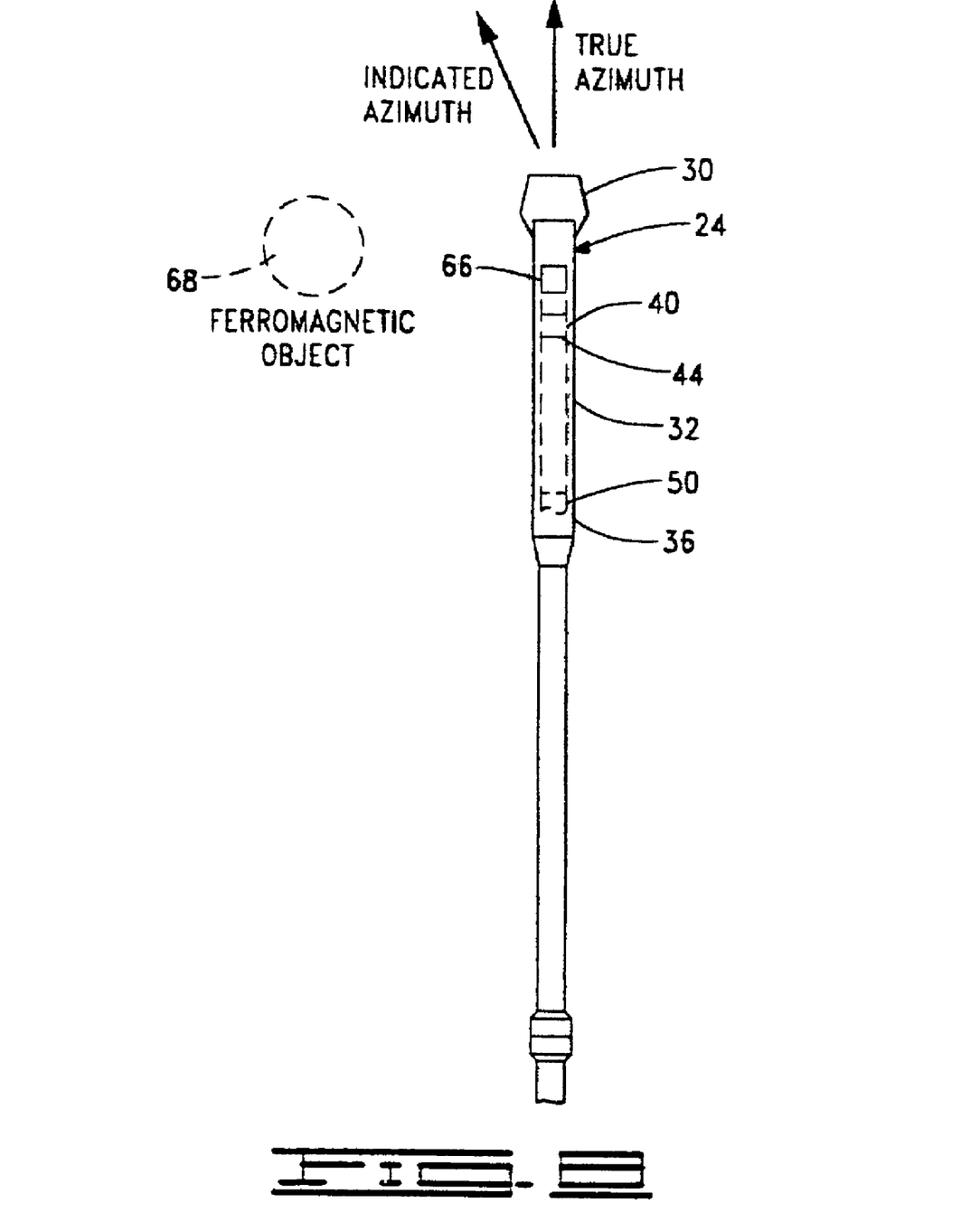
FIG. 8 is an alternative embodiment of the present invention showing a downhole end of drill string in relation to a buried object.

Additionally, other applications for the present invention are anticipated. For example, as depicted in FIG. 8 the present invention may be used in conjunction with an orientation sensor such as a magnetic compass 66 disposed within the beacon assembly 32, to detect and indicate azimuthal direction changes in addition to changes in grade of the borehole 12. The magnetic compass 66 or other sensor may be used to sense the orientation of the downhole tool assembly 24. The processor 40 is adapted to determine the magnitude and direction of angular deflection of the downhole tool assembly 24 in response to the signals from the receptor 44 and information received from the magnetic compass 66. A magnetic compass such as that disclosed in U.S. Pat. No. 5,850,624 may be used in conjunction with pitch and roll sensors 38 to provide an indication of pitch, roll, and azimuth of the boring tool.

Readings from the magnetic compass 66 are often affected as a bore passes in close proximity to a ferromagnetic object 68. The magnetic properties of the ferromagnetic body can distort earthen magnetic fields sensed by the compass 66, resulting in incorrect compass readings and ultimately an incorrect bore direction. The present invention may be used to provide a secondary indication of deflection of the boring tool 30 so as to verify a direction change indicated by the magnetic compass 66, or to detect a false indication of direction change due to magnetic interference with the magnetic compass.

It is clear that the present invention is well adapted to attain the ends and advantages mentioned as well as those inherent therein. While the presently preferred embodiments of the invention have been described for purposes of this disclosure, it will be understood that changes may be made in the combination and arrangement of the various parts, elements and procedures described herein without departing from the spirit and scope of the invention as defined in the following claims.

What is claimed is:

1. A downhole system for monitoring a downhole tool used in directional drilling, the system comprising:
   a receptor positioned proximate a downhole tool;
   a beam source emitting a beam and positioned such that the beam is unreflected and illuminates at least a portion of the receptor; and
   a processor adapted to receive signals from the receptor and to determine an angular deflection of the receptor relative to the beam source in response to the signals.

2. The downhole system of claim 1 further comprising a transmitter assembly adapted to transmit a signal containing information about the angular deflection of the receptor.

3. The downhole system of claim 2 wherein the transmitter assembly comprises an antenna for transmitting an electromagnetic signal and the information about the angular deflection is modulated on the signal.

4. The downhole system of claim 1 wherein the beam source comprises a laser.

5. The downhole system of claim 1 wherein the beam source comprises a high intensity light emitting diode.

6. The downhole system of claim 1 wherein the receptor comprises a plurality of photodiodes.

7. The downhole system of claim 6 wherein the photodiodes are arranged in an array.

8. The downhole system of claim 1 further comprising a housing defining a longitudinal cavity and having a first end, a second end, and a longitudinal axis;
   wherein the second end of the housing is connectable to a downhole tool; and
   wherein the receptor is supported in the housing such that the receptor is perpendicular to the longitudinal axis of the housing; and
   wherein the beam source is supported in the housing proximate the first end of the housing such that the beam emitted from the beam source is parallel to the longitudinal axis of the housing.

9. The downhole system of claim 8 wherein the beam source illuminates a center point of the receptor when the housing is not deflected.

10. The downhole system of claim 1 further comprising a sensor adapted to detect an orientation of the receptor.

11. The downhole system of claim 10 wherein the processor is further adapted to determine the direction of deflection of the housing in response to the signals and the orientation of the receptor.

12. A monitoring system for use with a horizontal directional drilling system comprising a drill string, the monitoring system comprising:
   a downhole tool assembly comprising:
      a housing defining a longitudinal cavity and having a first end and a second end, the first end connectable to the drill string;
      an alignment sensor assembly contained within the housing and comprising:
         a receptor positioned proximate the second end of the housing; and
         a processor operatively connected to the receptor;
      a downhole tool connectable to the second end of the housing of the alignment sensor assembly; and
      a beam source adapted to emit a beam and positioned such that the beam is unreflected and illuminates at least a portion of the receptor;
   wherein the processor is adapted to receive signals from the receptor and to determine an angular deflection of the downhole tool relative to the beam source in response to the signals.

13. The drilling system of claim 12 wherein the downhole tool comprises a directional drill bit.

14. The drilling system of claim 12 wherein the downhole tool comprises a backreamer.

15. The drilling system of claim 12 wherein the beam source is supported by the housing of the alignment sensor assembly proximate the first end of the housing.

16. The drilling system of claim 12 wherein the beam source is supported by the drill string proximate the downhole tool assembly.

17. The downhole system of claim 12 further comprising a sensor adapted to detect an orientation of the downhole tool.

18. The downhole system of claim 17 wherein the processor is further adapted to determine the angular deflection of the downhole tool relative to the beam source in response to the signals and the orientation of the downhole tool.

19. The downhole system of claim 18 wherein the sensor comprises a magnetic compass.

20. The downhole system of claim 19 wherein the processor is further adapted to compare a direction change sensed by the magnetic compass and the angular deflection determined in response to the signals from the receptor.

21. The downhole system of claim 18 wherein the trajectory of the downhole tool is adjusted in response to the indicated deflection of the downhole tool.

22. A method for detecting the angular deflection of a drill string, the method comprising:
   positioning a beam source in a drill string;
   directing an unreflected beam from a known distance at a receptor positioned in the drill sting;
   sensing an area on the receptor illuminated by the beam; and
   determining an angle of deflection of the drill string from the illuminated area on the receptor and the known distance the light beam traveled.

23. The method of claim 22 further comprising:
   sensing an orientation of the receptor; and determining a heading change from the angle of deflection and the orientation of the receptor.

24. The method of claim 22 wherein the beam is directed at and illuminates a center point of the receptor when the drill string section is not deflected.

25. The method of claim 22 further comprising:
connecting a downhole tool to the drill sting;
sensing an orientation of the downhole tool; and
wherein the angle of deflection is determined from the illuminated area on the receptor, a distance the beam traveled, and the orientation of the downhole tool.

26. The method of claim 22 further comprising using the determined deflection of the drill string to keep the drill string on a path.

* * * * *